(12) United States Patent
Imanaka

(10) Patent No.: US 8,004,213 B2
(45) Date of Patent: Aug. 23, 2011

(54) POWER SUPPLY, LIGHT EMISSION CONTROL DEVICE AND DISPLAY DEVICE

(75) Inventor: Yoshinori Imanaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 631 days.

(21) Appl. No.: 12/093,641

(22) PCT Filed: Feb. 6, 2007

(86) PCT No.: PCT/JP2007/051961
§ 371 (c)(1),
(2), (4) Date: May 14, 2008

(87) PCT Pub. No.: WO2007/094194
PCT Pub. Date: Aug. 23, 2007

(65) Prior Publication Data
US 2009/0160367 A1    Jun. 25, 2009

(30) Foreign Application Priority Data

Feb. 17, 2006    (JP) .................................. 2006-040436

(51) Int. Cl.
*H05B 37/02*    (2006.01)
(52) U.S. Cl. ............... 315/307; 315/209 R; 315/225; 363/60
(58) Field of Classification Search ............... 315/172, 315/173, 209 R, 224, 225, 291, 307; 363/59–62
See application file for complete search history.

(56) References Cited

U.S. PATENT DOCUMENTS

| 6,643,151 | B1 * | 11/2003 | Nebrigic et al. | 363/59 |
| 6,738,271 | B2 * | 5/2004 | Umeda | 363/60 |
| 7,072,193 | B2 * | 7/2006 | Lin | 363/59 |
| 7,205,728 | B2 * | 4/2007 | Brown | 315/291 |
| 2002/0110009 | A1 * | 8/2002 | Umeda | 363/60 |
| 2005/0258891 | A1 | 11/2005 | Ito et al. | |

FOREIGN PATENT DOCUMENTS

| JP | 2002-238243 | 8/2002 |
| JP | 2002-272091 | 9/2002 |
| JP | 2003-199329 | 7/2003 |
| JP | 2003-219314 | 7/2003 |
| JP | 2005-261102 | 9/2005 |
| JP | 2006-14581 | 1/2006 |
| TW | 200507453 | 2/2005 |

* cited by examiner

*Primary Examiner* — Jacob Y Choi
*Assistant Examiner* — Jimmy T Vu
(74) *Attorney, Agent, or Firm* — Fish & Richardson P.C.

(57) ABSTRACT

The power supply of the present invention is composed of: a charge pump circuit (54) that periodically turns on and off a plurality of charge-transfer switches (Q1 to Q4) according to clock signals (c1 and c2), thereby charges and discharges a charge storage capacitor (C1) and thus produces the desired output voltage (Vo) from an input voltage (Vi) to supply it to a load (LED); an output current detection circuit 57 for detecting an output current Io (a reference current (Im) thereof in FIG. 1) to the load; and means (a frequency conversion circuit 52 in FIG. 1) that varies the frequency of the clock signals c1 and c2 based on the result of the detection of the output current Io. With this configuration, it is possible to achieve high electric power efficiency irrespective of the magnitude of a load.

10 Claims, 4 Drawing Sheets

(a) OPERATION FREQUENCY vs POWER EFFICIENCY (b) OPERATION FREQUENCY vs OUTPUT VOLTAGE

POWER SUPPLY, LIGHT EMISSION CONTROL DEVICE AND DISPLAY DEVICE

TECHNICAL FIELD

The present invention relates to a power supply employing a charge pump circuit, and to a light emission control device and a display device incorporating such a power supply. More particularly, the invention relates to a technology for the improvement of the electric power efficiency of such devices.

BACKGROUND ART

FIG. 6 is a circuit diagram showing an example of a conventional charge pump circuit. The charge pump circuit shown in FIG. 6 periodically turns on and off a plurality of charge-transfer switches 101 to 104 according to clock signals (unillustrated), and thereby charges and discharges a charge storage capacitor 105 to produce a desired output voltage Vo (2Vi) from an input voltage Vi.

The positive step-up operation mentioned above will now be described specifically. The output voltage Vo is produced in the following manner. First, during a charging period, the switches 101 and 102 are kept on, and the switches 103 and 104 are kept off. By this switching operation, the input voltage Vi is applied to one end (point A) of the capacitor 105, and a ground voltage GND is applied to the other end (point B) of the capacitor 105. Accordingly, the capacitor 105 is charged until the potential difference across the capacitor 105 becomes substantially equal to the input voltage Vi.

After the completion of the charging of the capacitor 105, during a pumping period, the switches 101 and 102 are kept off, and the switches 103 and 104 are kept on. By this switching operation, the voltage at point B is raised from the ground voltage GND to the input voltage Vi. Here, since the potential difference across the capacitor 105 is substantially equal to the input voltage Vi as a result of the previously performed charging, as the potential at point B is raised to the input voltage Vi, the potential at point A is raised to 2Vi (input voltage Vi plus charged voltage Vi). Here, point A is connected to a grounded node via the switch 104 and an output capacitor 106, and thus the output capacitor 106 is charged until the potential difference across the output capacitor 106 becomes substantially equal to 2Vi.

In this way, the charge pump circuit 100 operates through the alternating charging and pumping periods described above to turn on and off the switches 101 to 104 periodically, and thus the positively stepped up voltage 2Vi obtained by positively stepping up the input voltage Vi by a factor of two is extracted as the output voltage Vo.

As another conventional technology related to charge pump circuits, for example, in patent document 1, the applicant of the present invention discloses and proposes a charge pump circuit that varies the frequency of a clock signal based on the result of the detection of an output voltage.
Patent document 1: JP-A-2002-272091

DISCLOSURE OF THE INVENTION

Problems to be Solved by the Invention

To be sure, with the conventional charge pump circuit 100 described above, by positively stepping up the input voltage Vi, it is possible to produce the desired output voltage Vo (2Vi).

Incidentally, in the conventional charge pump circuit described above, the relationship between the operation frequency fin (the frequency of a clock signal) and the electric power efficiency η (ratio of an output power to an input power) and the relationship between the operation frequency fin and the output voltage Vo vary according to the magnitude of a load and hence the magnitude of the output current Io fed to the load (see FIGS. 7A and 7B).

More specifically, in a case where the load is light, that is, the output current Io is low, as the operation frequency fin is increased, the electric power efficiency η of the charge pump circuit starts to decrease at a given frequency (see rhombic marks in FIG. 7A). This decrease in the electric power efficiency η is attributable to the fact that the charge pump circuit is operated at an unduly high speed.

In contrast to what precedes, in a case where the load is heavy, that is, the output current Io is high, as the operation frequency fin is decreased, the electric power efficiency η of the charge pump circuit starts to decrease at a given frequency (see square marks in FIG. 7A). Moreover, as the operation frequency fin becomes excessively low, the output voltage Vo as well as the electric power efficiency η decreases (see square marks in FIG. 7B). These decreases in the electric power efficiency η and the output voltage Vo are attributable to the inability of the charge pump circuit to step up voltage to the desired voltage.

In the conventional charge pump circuit described above, since the highest priority is given to prevention of lowering of the output voltage Vo, a rather high constant operation frequency (e.g., 400 to 1000 kHz) is selected. Thus, at a light load, the conventional charge pump circuit is operated at an unduly high speed, and this causes lowering of the electric power efficiency η.

An object of the present invention is to provide a power supply that achieves high electric power efficiency irrespective of the magnitude of a load, and to provide a light emission control device and a display device incorporating such a power supply.

Means for Solving the Problem

To achieve the above object, according to one aspect of the present invention, a power supply includes a charge pump circuit that periodically turns on and off a plurality of charge-transfer switches according to a clock signal, thereby charges and discharges a charge storage capacitor and thereby produces a desired output voltage from an input voltage to supply the thus produced output voltage to a load. Here, a frequency of the clock signal is varied according to a current flowing through the load (a first configuration).

In the power supply of the first configuration, as the current flowing through the load increases, the frequency of the clock signal may increase, and as the current flowing through the load decreases, the frequency of the clock signal may decrease (a second configuration).

In any one of the power supplies of the first and second configurations, the current flowing through the load may be detected by an output current detection circuit detecting a current commensurate with the output current (a third configuration).

In the power supply of the third configuration, the output current detection circuit may include: a transistor extracting the current commensurate with the output current; a sense resistor through which the current commensurate with the output current flows; and a comparator whose output level varies according to a potential difference across the sense resistor (a fourth configuration).

In the power supply of the fourth configuration, the output current detection circuit may detect whether the output current is higher than a predetermined threshold, and the frequency of the clock signal may be set at a first frequency if the output current is higher than the predetermined threshold, where as the frequency of the clock signal may be set at a second frequency lower than the first frequency if the output current is lower than the predetermined threshold (a fifth configuration).

In the power supply of the first configuration, the current flowing through the load may be monitored by the monitoring of a predetermined control signal used to control a drive current for the load (a sixth configuration).

The power supply of the sixth configuration may further include: a drive current generating circuit generating the drive current for the load; and a digital-to-analog converter generating an analog control signal suitable for control of the drive current generating circuit from a digital control signal for setting the drive current supplied to the load. Here, the control signal used for monitoring the current flowing through the load may be the digital control signal (a seventh configuration).

In the power supply of the seventh configuration, if the drive current required based on the control signal is higher than a predetermined threshold, the frequency of the clock signal may be set at a first frequency, and if the required drive current is lower than the predetermined threshold, the frequency of the clock signal may be set at a second frequency lower than the first frequency (an eighth configuration).

The power supply of any one of the first to eighth configurations may further include: an oscillation circuit generating a clock signal having a predetermined frequency; and a frequency conversion circuit varying the frequency of the clock signal. Here, the frequency of the clock signal of the charge pump circuit may be varied by the frequency conversion circuit (the ninth configuration).

The power supply of any one of the first to eighth configurations may further include an oscillation circuit generating a clock signal having a predetermined frequency. Here, the frequency of the clock signal of the charge pump circuit may be varied by the oscillation circuit (a tenth configuration).

According to another aspect of the invention, a light emission control device includes: a power supply supplying electric power to a light source serving as a load; and a controller varying a drive current for the light source based on a predetermined control signal. Here, the above-mentioned power supply supplying electric power to the load is the power supply of any one of the first to tenth configurations (an eleventh configuration).

According to yet another aspect of the invention, a display device includes: a display panel; a light source illuminating the display panel; and a controller controlling light emission of the light source. Here, the controller controlling light emission of the light source is the light emission control device of the eleventh configuration (a twelfth configuration).

Advantages of the Invention

With this invention, it is possible to provide a power supply that achieves high electric power efficiency irrespective of the magnitude of a load, and also to provide a light emission control device and a display device incorporating such a power supply.

LIST OF REFERENCE SYMBOLS

Figure 1:
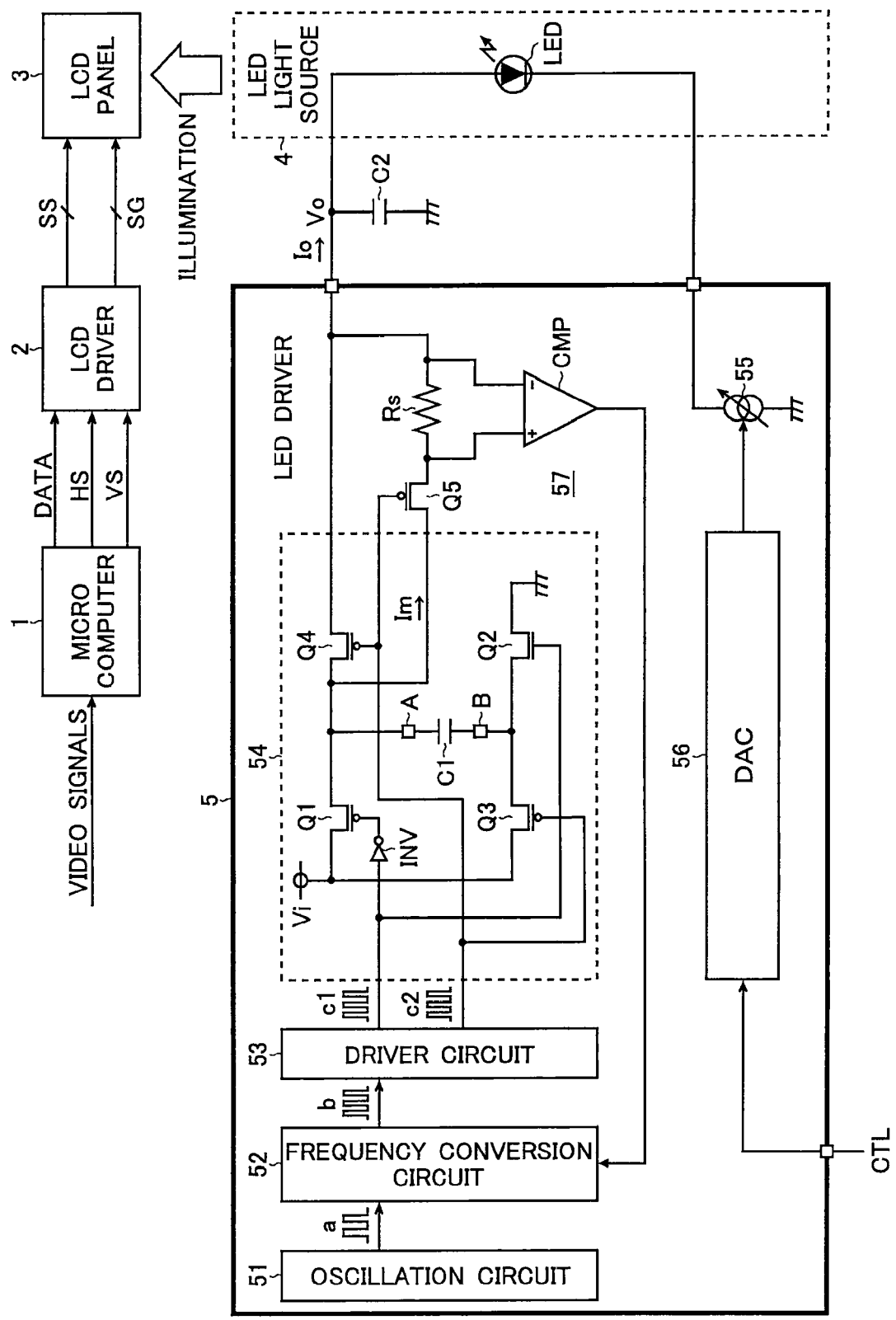
FIG. 1 A block diagram showing a liquid crystal display device incorporating an LED driver, as a first embodiment of the present invention.

1 Microcomputer
2 LCD driver
3 LCD panel
4 LED light source (backlight)
5 LED driver
51 Oscillation circuit
52 Frequency conversion circuit
53 Driver circuit
531 Timing generator
532 and 533 Buffer
54 Charge pump circuit
55 Drive current generating circuit
56 Digital-to-analog conversion circuit (DAC)
57 Output current detection circuit
Q1 to Q4 Charge-transfer transistor
C1 Charge storage capacitor
C2 Output capacitor
Q5 Mirror current generating transistor
INV Inverter
Rs Sense resistor
CMP Comparator
LED Light emitting diode

BEST MODE FOR CARRYING OUT THE INVENTION

FIG. 1 is a block diagram showing a liquid crystal display device incorporating an LED (light emitting diode) driver, as a first embodiment of the present invention.

As shown in FIG. 1, the liquid crystal display device of this embodiment is composed of a microcomputer 1, an LCD (liquid crystal display) driver 2, an LCD panel 3, an LED light source 4 and an LED driver 5.

The microcomputer 1 serves as means for overall control of the entire device, and also serves as means for separating and producing, from video signals received from an unillustrated media reproduction device or the like, data signals DATA for driving RGB pixels in the LCD panel 3 and frame synchronization signals (a horizontal synchronization signal HS for synchronization in the horizontal direction of the frame and a vertical synchronization signal VS for synchronization in the vertical direction of the frame) for synchronization in the screen display by the LCD panel 3.

The LCD driver 2 is composed of a source control section and a gate control section (neither is illustrated), and serves as means that generates, based on the data signals DATA and the frame synchronization signals (the horizontal synchronization signal HS and the vertical synchronization signal VS)

from the microcomputer 1, source signals and gate signals, respectively, for the LCD panel 3 and that feeds these signals to the LCD panel 3.

The LCD panel 3 has a plurality of source and gate signal lines laid in vertical and horizontal directions, respectively, all over it, and drives liquid crystal pixels disposed at the intersections of these signal lines by tuning on and off active elements (field effect transistors) corresponding to the liquid crystal pixels (the LCD panel 3 thus being of the active matrix type).

The LCD driver 2 and the LCD panel 3 may be configured otherwise than described above; they may be of the simply matrix type.

The LED light source 4 serves as means for backlighting the LCD panel 3, and includes a light emitting diode LED emitting white light (generally, a group of light emitting diodes composed of red, green and blue light emitting diodes). Although unillustrated in FIG. 1, between the LCD panel 3 and the LED light source 4, there is provided means that guides the white light produced by the LED light source 4 so that it evenly illuminates the entire LCD panel 3.

The LED driver 5 serves as means for light emission control (brightness adjustment, white balance adjustment and other adjustment) of the LED light source 4. The LED driver 5 of this embodiment is composed of an oscillation circuit 51, a frequency conversion circuit 52, a driver circuit 53, a charge pump circuit 54, a drive current generating circuit 55, a digital-to-analog conversion circuit 56 (hereinafter called "DAC (digital-to-analog converter) 56") and an output current detection circuit 57.

The oscillation circuit 51 serves as means that generates a clock signal "a" having a predetermined frequency.

The frequency conversion circuit 52 serves as means that performs, based on the result of the detection of the output current detection circuit 57, PFM (pulse frequency modulation) on the clock signal "a" to produce clock signal "b" having a frequency fin.

Figure 2:
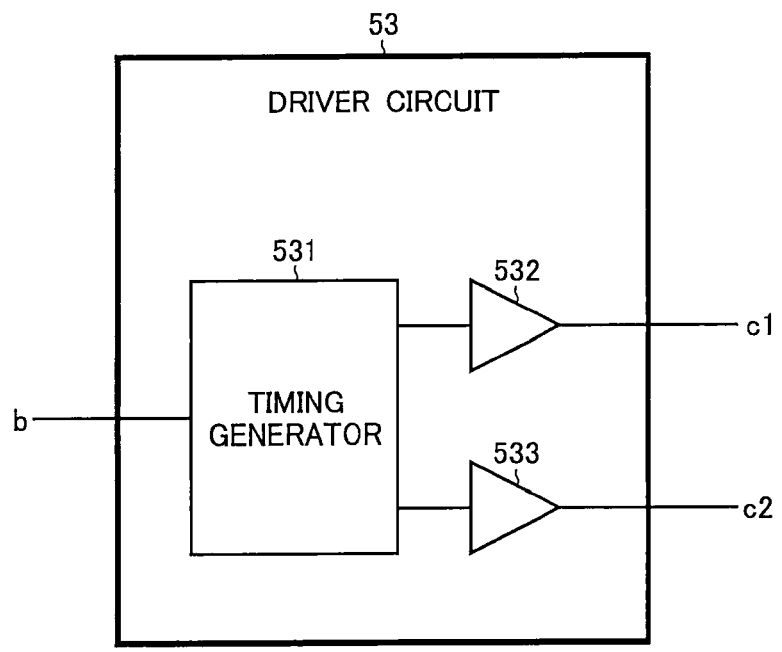
FIG. 2 A block diagram showing an example of the configuration of a driver circuit 53.
Figure 3:
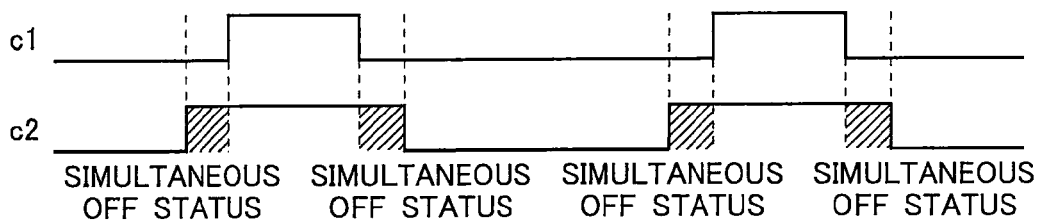
FIG. 3 A pulse waveform diagram showing an example of clock signals c1 and c2.

The driver circuit 53 serves as means that generates clock signals c1 and c2 for use in switching control in the charge pump circuit 54. As shown in FIG. 2, the driver circuit 53 is composed of: a timing generator 531 generating the clock signals c1 and c2 from the clock signal b; and buffers 532 and 533 that gives the clock signals c1 and c2 a current feeding capacity and then outputs them. In the timing generator 531, as shown in FIG. 3, the timing of the clock signals c1 and c2 is adjusted so that charge-transfer switches in the charge pump circuit 54 simultaneously remains off during a predetermined period.

The charge pump circuit 54 severs as means that periodically turns on and off a plurality of charge-transfer switches (p-channel field effect transistors Q1, Q3 and Q4 and an n-channel field effect transistor Q2) according to the clock signals c1 and c2, and thereby charges and discharges a charge storage capacitor C1, thus producing the desired output voltage Vo (2Vi) from an input voltage Vi and feeding this voltage to a load (light emitting diode LED). An output capacitor C2 is connected between an output node, i.e., the node from which the output voltage Vo is outputted, and a grounded node. As a direct-current voltage source generating the input voltage Vi, a secondary battery such as a lithium-ion battery may be used, or an AC-to-DC converter may be used that generates a direct-current voltage from a commercially distributed alternating-current voltage.

Thus, in the LED driver 5 of this embodiment, the oscillation circuit 51, the frequency conversion circuit 52, the driver circuit 53 and the charge pump circuit 54 together constitute means (a power supply) for supplying electric power to the LED light source 4 serving as a load.

The drive current generating circuit 55 serves as means (a variable current source) that generates, based on an analog control signal inputted from the DAC 56, a drive current for the light emitting diode LED.

The DAC 56 serves as means that generates, from a digital control signal CTL for setting the drive current fed to the light emitting diode LED, an analog control signal suitable for the control of the drive current generating circuit 55, and that feeds this analog control signal to the drive current generating circuit 55. The DAC 56 also serves as a register that temporarily holds the digital control signal CTL inputted thereto.

Thus, in the LED driver 5 of this embodiment, the drive current generating circuit 55 and the DAC 56 together constitute means that controls the drive current for the LED light source 4 based on the digital control signal CTL. With this configuration provided with means for controlling the drive current, it is possible to perform light emission control (brightness adjustment, white balance adjustment and other adjustment) on the LED light source 4 based on the digital control signal CTL.

The output current detection circuit 57 serves as means that detects the output current Io (in this embodiment, a reference current Im whose current level varies with the output current Io,) to the light emitting diode LED, and is composed of an n-channel field effect transistor Q5, a sense resistor Rs and a comparator CMP.

Now, the configuration and operation of the charge pump circuit 54 described previously will be described in greater detail.

In the charge pump circuit 54, the source of the transistor Q1 is connected to an input node, i.e., the node to which the input voltage Vi is inputted (hereinafter called "input voltage input terminal"). The drain of the transistor Q1 is connected to one end (point A) of the capacitor C1. The gate of the transistor Q1 is connected via an inverter INV to the first output terminal of the driver circuit 53; the clock signal c1 is inverted and fed to the gate. As will be understood from what has just been described, the transistor Q1 serves as switch means that turns on and off the connection path between the input voltage input terminal and the one end (point A) of the capacitor C1.

The drain of the transistor Q2 is connected to the other end (point B) of the capacitor C1. The source of the transistor Q2 is connected to the grounded node. The gate of the transistor Q2 is connected to the first output terminal of the driver circuit 53 so as to receive the clock signal c1. As will be understood from what has just been described, the transistor Q2 serves as switch means that turns on and off the connection path between the grounded node and the other end (point B) of the capacitor C1.

The source of the transistor Q3 is connected to the input voltage input terminal. The drain of the transistor Q3 is connected to the other end (point B) of the capacitor C1. The gate of the transistor Q3 is connected to the second output terminal of the driver circuit 53 so as to receive the clock signal c2. As will be understood from what has just been described, the transistor Q3 serves as switch means that turns on and off the connection path between the input voltage input terminal and the other end (point B) of the capacitor C1.

The source of the transistor Q4 is connected to the one end (point A) of the capacitor C1. The drain of the transistor Q4 is connected to the output node (hereinafter called "output voltage output terminal") from which the output voltage Vo is outputted. The gate of the transistor Q4 is connected to the second output terminal of the driver circuit 53 so as to receive the clock signal c2. As will be understood from what has just been described, the transistor Q4 serves as switch means that turns on and off the connection path between the output voltage output terminal and the one end (point A) of the capacitor C1.

The positive step-up operation of the charge pump circuit 54 configured as described above will be described specifically. The output voltage Vo is produced in the following manner. First, during a charging period, the transistors Q1 and Q2 are kept on, and the transistors Q3 and Q4 are kept off (that is, the clock signals c1 and c2 remains high). By this switching operation, the input voltage Vi is applied to the one end (point A) of the capacitor C1; a ground voltage GND is applied to the other end (point B) of the capacitor C1. Accordingly, the capacitor C1 is charged until the potential difference across the capacitor C1 becomes substantially equal to the input voltage Vi.

After the completion of the charging of the capacitor C1, during a pumping period, the transistors Q1 and Q2 are kept off, and the transistors Q3 and Q4 are kept on (that is, the clock signals c1 and c2 remains low). By this switching operation, the voltage at point B is raised from the ground voltage GND to the input voltage Vi. Here, since the potential difference across the capacitor C1 is substantially equal to the input voltage Vi as a result of the previously performed charging, as the potential at point B is raised to the input voltage Vi, the potential at point A is raised to 2Vi (input voltage Vi plus charged voltage Vi). Here, point A is connected to the grounded node via the transistor Q4 and the output capacitor C2, and thus the output capacitor C2 is charged until the potential difference across the output capacitor C2 becomes substantially equal to 2Vi.

As described above, the charge pump circuit 54 operates through the above-described charging and pumping periods alternately to turn on and off the transistors Q1 to Q4 periodically, and thus the positively stepped up voltage 2Vi obtained by positively stepping up the input voltage Vi by a factor of two is extracted as the output voltage Vo.

A detailed description will now be given of the configuration of the output current detection circuit 57 and the operation of the frequency conversion circuit 52 based on the result of the detection by the output current detection circuit 57.

In the output current detection circuit 57, the source of the transistor Q5 is connected to the one end (point A) of the capacitor C1. The drain of the transistor Q5 is connected via the sense resistor Rs to the output voltage output terminal. The gate of the transistor Q5 is connected to the second output terminal of the driver circuit 53 so as to receive the clock signal c2. As will be understood from what has just been described, the transistor Q5 serves as switch means that is turned on and off in synchronism with the transistor Q4 to extract the reference current Im from one end (point A) of the capacitor C1. The transistor Q5 is designed to have a gate area 1/N (e.g., 1/10000) of that of the transistor Q4. Hence, the reference current Im is 1/N of the output current Io. Detecting the reference current Im in this way eliminates the need to put a sense resistor in the current path to the load, and thus helps prevent loss of electric power.

The non-inverting input terminal (+) of the comparator CMP is connected to one end (the transistor Q5-side end) of the sense resistor Rs. The inverting input terminal (−) of the comparator CMP is connected to the other end (the output voltage output terminal-side end) of the sense resistor Rs. The output terminal of the comparator CMP is connected to the control terminal of the frequency conversion circuit 52. Thus, the comparator CMP shifts its output level according to whether or not the potential difference across the sense resistor Rs (corresponding to the reference current Im, and hence the output current Io) is larger than a predetermined threshold.

That is, the output current detection circuit 57 of this embodiment serves to detect whether or not the output current Io is higher than the predetermined threshold current Ith.

Figure 4:
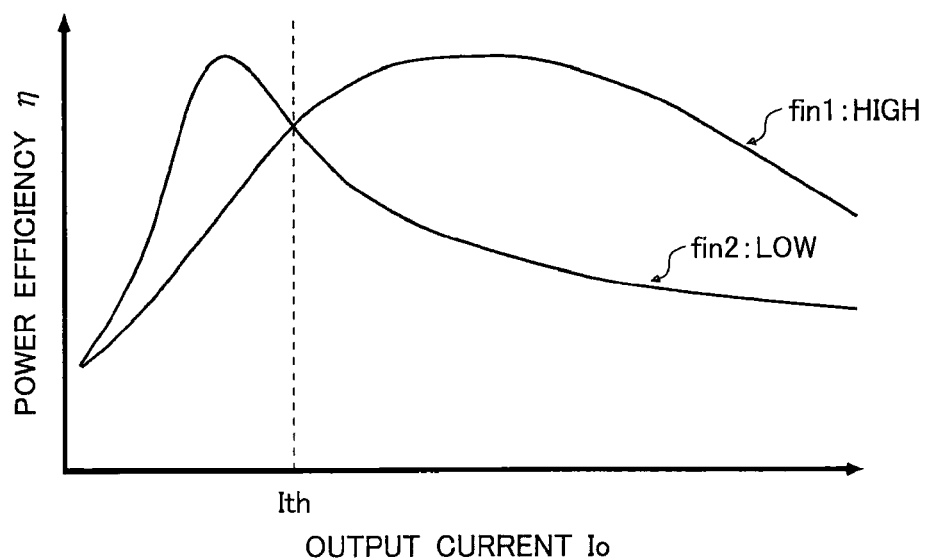
FIG. 4 A diagram showing the relationship between output current Io and electric current efficiency η.

Based on the result of the detection by the output current detection circuit 57, the frequency conversion circuit 52 of this embodiment sets, if the output current Io is higher than the predetermined threshold current Ith, the frequency fin of the clock signal b (and hence the frequency fin of the clock signals c1 and c2, and thus the operation frequency fin of the charge pump circuit 54) at the first frequency fin1; by contrast, the frequency conversion circuit 52 sets, if the output current Io is lower than the predetermined threshold current Ith, the frequency fin of the clock signal b at the second frequency fin2 lower than the first frequency fin1 (see FIG. 4). That is, in the frequency conversion circuit 52 of this embodiment, at a light load, the frequency fin of the clock signal b is varied so that the operation frequency fin of the charge pump circuit 54 is lowered; by contrast, at a heavy load, the frequency fin of the clock signal b is varied so that the operation frequency fin of the charge pump circuit 54 is raised.

With this configuration employing output current feedback, unlike the conventional configuration where the operation frequency fin of the charge pump circuit 54 is fixed, it is possible to avoid unduly high-speed operation at a light load and lowering of step-up performance at a heavy load. This helps obtain enhanced electric power efficiency η irrespective of the magnitude of the load.

With this configuration, where the frequency conversion circuit 52 is provided in the stage preceding the driver circuit 53, it is possible not only to improve the electric power efficiency of the charge pump circuit 54, but also to reduce the power consumption of the driver circuit 53. This helps reduce the power consumption of the entire LED driver 5.

Figure 7A:
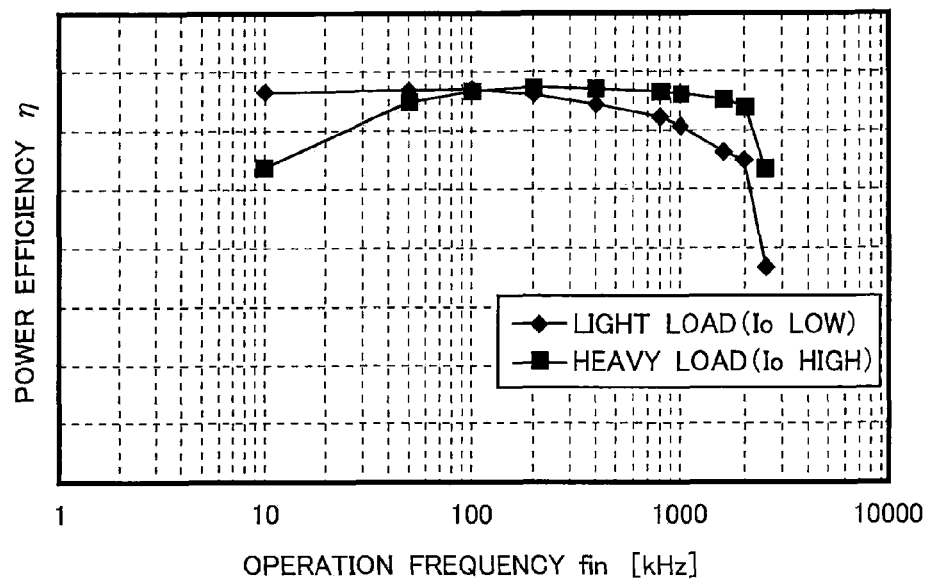
FIG. 7A A diagram showing the relationship between operation frequency fin and electric power efficiency η.
Figure 7B:
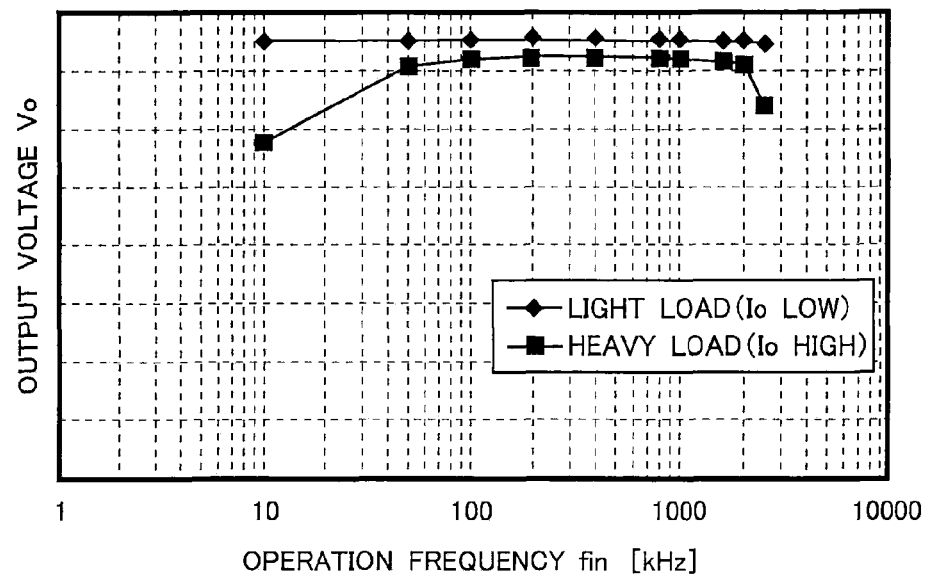
FIG. 7B A diagram showing the relationship between operation frequency fin and output voltage Vo.

The threshold current Ith and the first and second frequencies fin1 and fin2 mentioned above are appropriately set in consideration of the relationship (like the one shown in FIG. 7A) between the operation frequency fin and the electric power efficiency η of the charge pump circuit 54 and the relationship (like the one shown in FIG. 7B) between the operation frequency fin and the output voltage Vo of the charge pump circuit 54.

Figure 5:
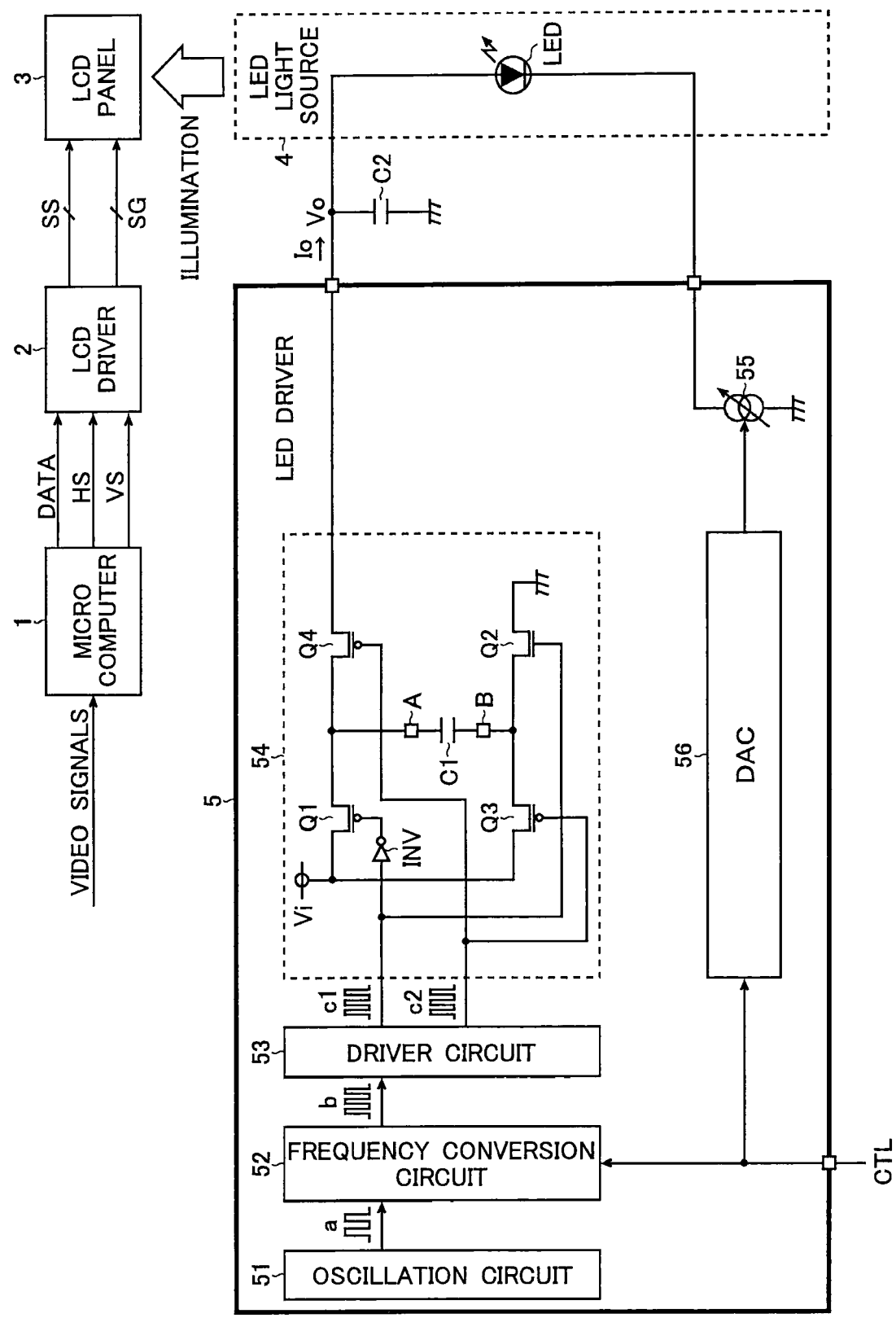
FIG. 5 A block diagram showing a liquid crystal display device incorporating an LED driver, as a second embodiment of the invention.
Figure 6:
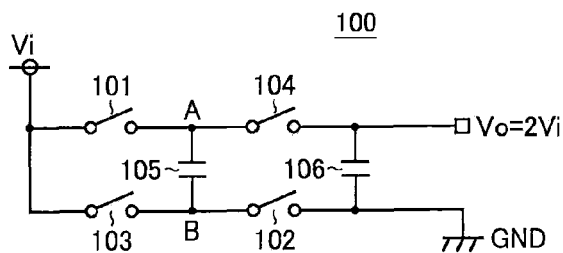
FIG. 6 A circuit diagram showing an example of a conventional charge pump circuit.

With reference to FIG. 5, a description will now be given of a liquid crystal display device incorporating an LED driver, as a second embodiment of the invention.

FIG. 5 is a block diagram showing the liquid crystal display device incorporating the LED driver according to the second embodiment of the invention.

The liquid crystal display device of this embodiment has substantially the same configuration as that of the first embodiment. Accordingly, such parts as are found also in the first embodiment are identified with common reference numerals, and no detailed description thereof will be repeated. The following description thus places emphasis on the features unique to this embodiment.

As shown in FIG. 5, in the LED driver 5 of this embodiment, the output current detection circuit 57 described previously is omitted; instead, the frequency conversion circuit 52 uses the digital control signal CTL, which is used to vary the drive current for the light emitting diode LED, so that the frequency fin of the clock signal b is varied based on the digital control signal CTL.

More specifically, based on the digital control signal CTL, the frequency conversion circuit 52 of this embodiment sets, if the drive current (and hence the output current Io) required for the light emitting diode LED is higher than the predetermined threshold current Ith, the frequency fin of the clock signal b (and hence the frequency fin of the clock signals c1 and c2, and thus the operation frequency fin of the charge pump circuit 54) at the first frequency fin1; by contrast, the frequency conversion circuit 52 sets, if the required drive current is lower than the predetermined threshold current Ith, the frequency fin of the clock signal b at the second frequency fin2 lower than the first frequency fin1 (see FIG. 4). That is, in the frequency conversion circuit 52 of this embodiment, as in the first embodiment, at a light load, the frequency fin of the clock signal b is varied so that the operation frequency fin of the charge pump circuit 54 is lowered; by contrast, at a heavy load, the frequency fin of the clock signal b is varied so that the operation frequency fin of the charge pump circuit 54 is raised.

With this configuration employing register setting, as compared with the first embodiment, it is possible, without the need for the output current detection circuit 57, to avoid unduly high-speed operation at a light load and lowering of step-up performance at a heavy load. Thus, with a simpler configuration, it is possible to obtain the same benefits as in the first embodiment.

Although the above embodiments deal with cases where the present invention is applied to the power supply in the LED driver incorporated in the liquid crystal display device, this is not meant to limit the application of the invention. The invention finds wide application in power supplies incorporating a charge pump circuit in general.

Many modifications and variations are possible without departing from the scope of the present invention.

Although the above embodiments deal with the case where the frequency conversion circuit 52 is provided as means that controls the frequency fin of the clock signals c1 and c2 (and hence the operation frequency fin of the charge pump circuit 54), the invention is not limited to such a configuration. For example, the charge pump circuit 54 may be controlled with single-phase clock signals; the frequency conversion circuit 52 may be omitted and an oscillation circuit 51 that can freely vary the oscillation frequency may be provided so that the oscillation frequency of the oscillation circuit 51 is varied based on the result of the detection by the output current Io or based on control signals CTL fed from outside the device.

Although the first embodiment deals with the case where the comparator CMP is used as one component of the output current detection circuit 57, the invention is not limited to such a configuration. Instead of the comparator CMP, an amplifier that amplifies the voltage across the sense resistor Rs may be provided so that the operation frequency fin of the charge pump circuit 54 is varied based on the amplified output.

Although the above embodiments deal with the case where the charge pump circuit 54 is used that positively steps up voltage by a factor of two, the invention is not limited to such a configuration. Any charge pump circuit may be used, irrespective of whether it is of the positive or negative step-up type or what its step-up factor is, so long as it can periodically turn on and off charge-transfer switches according to clock signals and thereby charge and discharge a charge storage capacitor to produce the desired voltage from an input voltage.

INDUSTRIAL APPLICABILITY

The technology of the present invention is useful for the improvement of the electric power efficiency of a power supply incorporating a charge pump circuit, and is suitable for use in, for example, portable devices operating from a buttery.

What is claimed is:

1. A power supply comprising:
a charge pump circuit to periodically turn on and off a plurality of charge-transfer switches according to a clock signal, to thereby charge and discharge a charge storage capacitor and thereby produce a desired output voltage from an input voltage to supply the thus produced output voltage to a load, wherein, as the current flowing through the load is detected by an output current detection circuit, a current commensurate with the output current is detected;
a transistor to extract the current commensurate with the output current;
a sense resistor through which the current commensurate with the output current flows; and
a comparator whose output level varies according to a potential difference across the sense resistor,
wherein a frequency of the clock signal is varied according to the current flowing through the load.

2. The power supply of claim 1, arranged so that as the current flowing through the load increases, the frequency of the clock signal increases, and as the current flowing through the load decreases, the frequency of the clock signal decreases.

3. The power supply of claim 1, wherein the output current detection circuit is arranged to detects whether the output current is higher than a predetermined threshold, the frequency of the clock signal being set at a first frequency if the output current is higher than the predetermined threshold, the frequency of the clock signal being set at a second frequency lower than the first frequency if the output current is lower than the predetermined threshold.

4. A power supply comprising:
a charge pump circuit to periodically turn on and off a plurality of charge-transfer switches according to a clock signal, to thereby charge and discharge a charge storage capacitor and thereby produce a desired output voltage from an input voltage to supply the thus produced output voltage to a load, wherein, as current flowing through the load is detected by an output current detection circuit, a current commensurate with the output current is detected, and wherein the current flowing through the load is monitored through monitoring of a predetermined control signal used to control a drive current for the load;
a drive current generating circuit to generate the drive current for the load; and
a digital-to-analog converter to generate an analog control signal suitable for control of the drive current generating circuit from a digital control signal for setting the drive current supplied to the load,
wherein the control signal used for monitoring the current flowing through the load is the digital control signal, and
wherein a frequency of the clock signal is varied according to the current flowing through the load.

5. The power supply of claim 4 arranged so that as the current flowing through the load increases, the frequency of the clock signal increases, and as the current flowing through the load decreases, the frequency of the clock signal decreases.

6. The power supply of claim 4, arranged such that if the drive current required based on the control signal is higher than a predetermined threshold, the frequency of the clock signal is set at a first frequency, and if the required drive current is lower than the predetermined threshold, the frequency of the clock signal is set at a second frequency lower than the first frequency.

7. The power supply of any one of claims 2, 1, 3, 4, 6 or 5, further comprising:
   an oscillation circuit to generate a clock signal having a predetermined frequency; and
   a frequency conversion circuit to vary the frequency of the clock signal,
   wherein the frequency of the clock signal of the charge pump circuit is varied by the frequency conversion circuit.

8. The power supply of any one of claims 2, 1, 3, 4, 6 or 5, further comprising an oscillation circuit to generate a clock signal having a predetermined frequency,
   wherein the frequency of the clock signal of the charge pump circuit is varied by the oscillation circuit.

9. A light emission control device comprising:
   a power supply to supply electric power to a light source serving as a load; and
   a controller to vary a drive current for the light source based on a predetermined control signal,
   wherein the means for supplying electric power to the load is the power supply of any one of claims 2, 1, 3, 4, 6 or 5.

10. A display device comprising:
    a display panel;
    a light source to illuminate the display panel; and
    a controller to control light emission of the light source,
    wherein the means for controlling light emission of the light source is the light emission control device of claim 9.

* * * * *